United States Patent
Tseng et al.

(10) Patent No.: US 6,370,749 B1
(45) Date of Patent: Apr. 16, 2002

(54) HEAT PIPE SHAPING DEVICE

(75) Inventors: Leo Tseng; Adol Yang, both of Sanchung (TW)

(73) Assignee: Chaun-Choung Technology Corp., Taipei Hsien (TW)

( * ) Notice: Subject to any disclaimer, the term of this patent is extended or adjusted under 35 U.S.C. 154(b) by 0 days.

(21) Appl. No.: 09/718,508

(22) Filed: Nov. 24, 2000

(51) Int. Cl.⁷ ................................................. B23P 25/00
(52) U.S. Cl. ....................... 29/33 T; 29/33 G; 29/726.5; 29/723; 29/890.053
(58) Field of Search ................................. 29/726, 726.5, 29/723, 33 T, 33 G, 890.03, 890.053, 890.054; 219/59.1, 60 R, 61; 228/183; 83/24, 25, 54, 100, 103, 375, 382, 454, 466.1, 623, 636, 639.1, 694, 697, 914; 30/92, 28, 175, 182

(56) References Cited

U.S. PATENT DOCUMENTS

| 4,570,051 A | * | 2/1986 | Miwa |
| 4,837,419 A | * | 6/1989 | Boatwright et al. |
| 4,870,734 A | * | 10/1989 | Sulzberger |
| 5,375,756 A | * | 12/1994 | Haughton et al. |
| 5,692,295 A | * | 12/1997 | Dahl |
| 6,237,204 B1 | * | 5/2001 | Hoglund et al. |

* cited by examiner

Primary Examiner—S. Thomas Hughes
Assistant Examiner—T. Nguyen
(74) Attorney, Agent, or Firm—Rosenberg, Klein & Lee

(57) ABSTRACT

A heat pipe shaping device comprises a rectangular table, and each lateral surface of the table has a work station. The top plate of the table is elevated by a plurality of supporting rods at a periphery of the table. A vacuum manifold is connected to the top plate. Thereby, the vacuum manifold is connected to a vacuum pump. A welding gun is positioned at the top plate so that the welding gun is connected to a welding machine. Each work station is connected to a surface of the rotary disk on the table and the rotary disk is driven by a motor in the table. Each work station on the rotary disk has an supporter. A top of each supporter is installed with a pressing unit and a cutting unit. One end of the vacuum manifold is installed with a clamping unit for clamping a heat pipe to pump into a vacuum condition,. The heat pipe is then pressed to seal the opening, and the distal end is cut by the cutting unit, and finally, the opening is spot-welded. The vacuum manifold and the welding gun are positioned above the alternative spaced work stations for performing the operations of clamping a heat pipe, pumping to a vacuum, pressing and cutting, spot-welding, releasing the holding unit.

4 Claims, 9 Drawing Sheets

HEAT PIPE SHAPING DEVICE

FIELD OF THE INVENTION

The present invention relates to a heat pipe shaping device, and especially to a device for sealing an opening of a heat pipe with less volume and high manufacturing speed.

BACKGROUND OF THE INVENTION

With reference to FIGS. 1 to 3, a prior art heat pipe shaping device is formed. The heat pipe shaping device has an oblong casing 1. A front side of the casing 1 is installed with a control table 11. A bank of a plurality of control keys 12 is formed on the control table 11. The control table 11 has a bank of a plurality of control keys 12. A plurality of vacuum manifolds 13 formed as a bank with respect to the control keys 12 are installed in the table 1. Each vacuum manifold 13 is connected to a trunk vacuum manifold 14. The vacuum manifold 14 is connected to a vacuum motor 15. The vacuum motor 15 pumps the vacuum manifolds 13, 14 to generate a vacuum absorbing force. Each vacuum manifold is arranged in order. The lower end of the vacuum manifold is vertically downwards and the lower end thereof is connected with a holding element 16 for being connected to a heat pipe.

The following will described the structure of a heat pipe, in general, the heat pipe is a short and slender pipe, preferably, a copper tube. There is a front manufacturing process, while a rear manufacturing process is the main concern of the present invention. In the front manufacturing process, a pipe with a proper length is acquired. The lower end of the pipe is sealed. The water cleaning is performed to the pipe. Then a liquid, for example, water, and an element for guiding flowing is placed therein. Thus, is a semi-product of the heat pipe. Since the liquid in the heat pipe has a capillary effect only in a vacuum condition, the opening of the semi-product of the heat pipe must be sealed.

In the aforesaid prior art, after the clamping element 16 of the vacuum manifold 13 clamps the semi product of the heat pipe 4, the control key 12 is pressed for opening a solenoid valve 17 of one vacuum manifold 13 so as to be pump into vacuum condition. In the prior art structure, the time for vacuuming is long. The figure shows the vacuum structure of 14 stations. In practical application, there are 20 stations for vacuumization. In general, a time period of 3 to 5 minutes is acquired.

The operation time is set by the machine. But the semi-product of the heat pipe 4 moving toward the holding element 16 can not be automatized. Therefore, an operator must connect the heat pipe to the holding element and inspects the pump process and final product. The labor can not be saved. Therefore, an operator places the semi-product of the heat pipe in the holding element for pumping to vacuum.

In the casing, as guide track 18 is at a rear side of the holding element 16. A sliding block 181 is formed on the guide track 18. A press unit 19 is on the sliding block 181. A cylinder serves to move the cutting unit 191 and the welding machine 192 forwards and backwards. Since only one unit for pressing, cutting and welding on the sliding block 181 is installed. It only moves leftwards and rightwards. After a pumping stage is accomplished, a hydraulic unit causes a pair of press blocks of the press unit 19 to seal the produced heat pipe. If the opening of the heat pipe is not sealed through a longer time, the vacuum is destroyed. Therefore, as the upper end of the heat pipe is pressed and sealed, then the upper end of the heat pipe is cut automatically. That is, an automatic operation is performed by a cutting unit 191 of the sliding block 181. When clamping, only a clamping action serves to seal and press the upper end of the heat pipe. The unnecessary tube section of the heat pipe is cut out. Then, the welding head of the welding machine 192 on the sliding block 181 contacts with the welding opening of the heat pipe for spot-welding the opening and sealing the opening so that the heat pipe becomes a vacuum product.

After a product is accomplished at a first station, the operator installs the heat pipe to a final position, then the operator returns to the first station, and to release the holding element for taking out the product of the heat pipe. Therefore, every one station, the operation of positioning the product and semi-product can be performed. In each stage, the time of operation is identical, but the operation is confined by the vacuum operation, the working time must be prolonged. If a plurality of pumping device are used, the length of the machine body becomes too long to a value of 4 meter, moreover, a long channel is necessary. But the operation length is too long, more time is necessary. Furthermore, the stability in vacuum is bad so that the yield ratio of the product is low. Further, the operation is inconvenient. The large machine body occupies a larger volume of the plants.

SUMMARY OF THE INVENTION

Accordingly, the primary object of the present invention is to provide a heat pipe shaping device, wherein a structure for pump a heat pipe to a vacuum condition which is a necessary process in sealing an opening of the heat pipe at a processing of shaping a heat pipe is installed, and the structure is rotatable or swingable. The table only occupies a small volume and the operator is only necessary to position in a single position and only several heat pipes (not over four heat pipes) are operated in the vacuum operation. Thereby, the vacuum of the heat pipes formed by the present invention is better than the prior art and the time of pump is shorter than the prior art. The yield ratio of the product is increased. The arranged of the table cause that the operator operates without needing to move. The inconvenience in operation is prevented and the waiting time in operation is shortened. Therefore, the mass production is possible with a preferable quality. Furthermore, the cost and occupied volume of the equipment is reduced.

Another object of the present invention is to provide a heat pipe shaping device, wherein four work stations are installed cyclically in a table for a reciprocal swinging structure by the table is illustrated. A work station at one sides serves to detach the heat pipe, and seal and spot-welding the opening of the heat pipe, while a work station at another side serves to install and fix a semi-product of the heat pipe, pumping the heat pipe to a vacuum, pressing the heat pipe, and cutting the unnecessary section of the heat pipe. A machining operation at two sides or multiple sides can be performed so that the arrangements of worker and tables are improved and thus, a higher efficiency is formed.

To achieve the object, the present invention provides a heat pipe shaping device comprising a rectangular table, and each lateral surface of the table has a work station. The top plate of the table is elevated by a plurality of supporting rods at a periphery of the table. A vacuum manifold is connected to the top plate. Thereby, the vacuum manifold is connected to a vacuum pump. A welding gun is positioned at the top plate so that the welding gun is connected to a welding machine. Each work station is connected to a surface of the rotary disk on the table and the rotary disk is driven by a motor in the table. Each work station on the rotary disk has an supporter. A top of each supporter is installed with a pressing unit and a cutting unit. One end of the vacuum manifold is installed with a clamping unit for clamping a heat pipe to pump into a vacuum condition, The heat pipe is then pressed to seal the opening, and the distal end is cut by the cutting unit, and finally, the opening is spot-welded. The vacuum manifold and the welding gun are positioned above the alternative spaced work stations for performing the operations of clamping a heat pipe, pumping to a vacuum, pressing and cutting, spot-welding, releasing the holding unit are performed.

The various objects and advantages of the present invention will be more readily understood from the following detailed description when read in conjunction with the appended drawing.

DETAILED DESCRIPTION OF THE PREFERRED EMBODIMENTS

Figure 1:
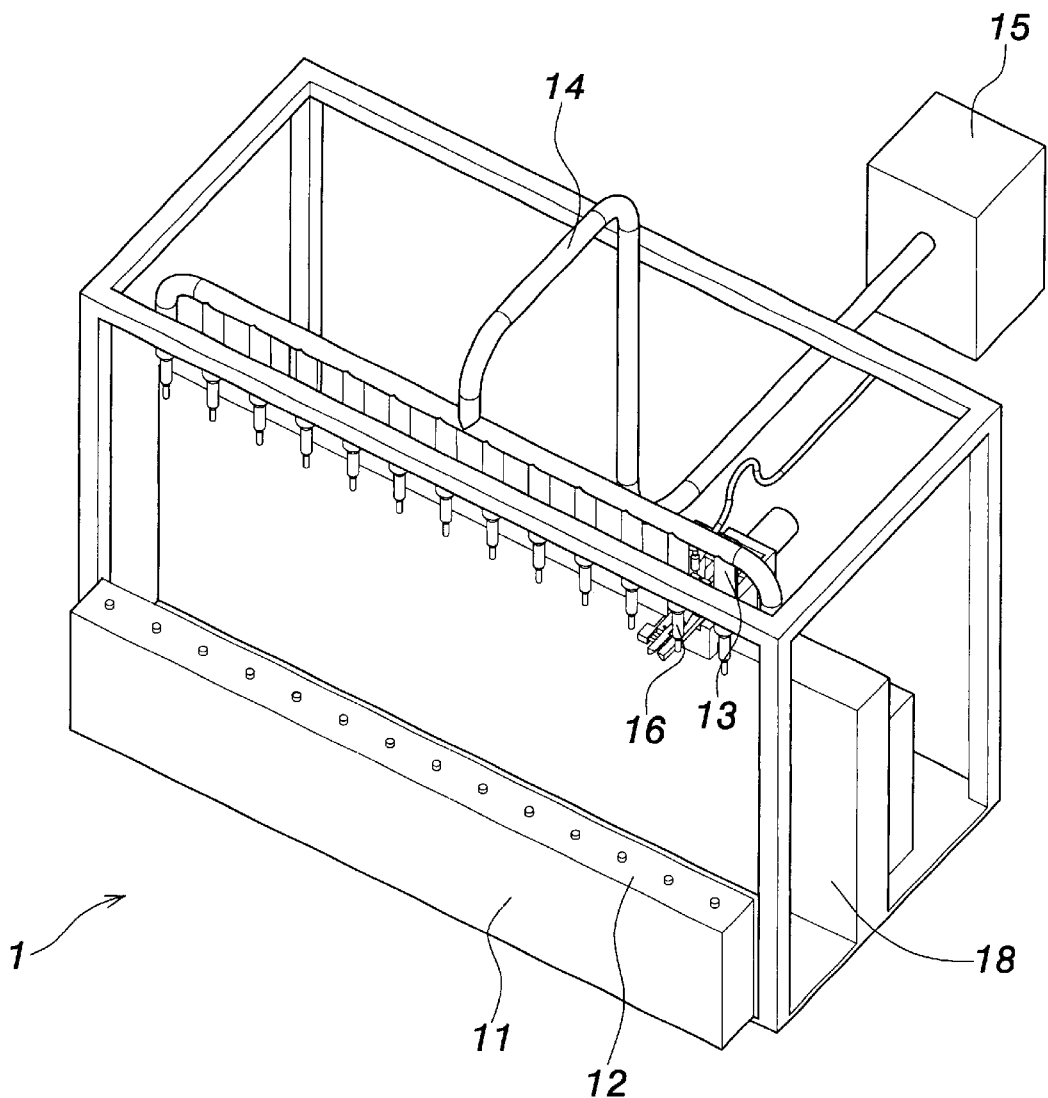
FIG. 1 is a perspective view of a prior art design.
Figure 2:
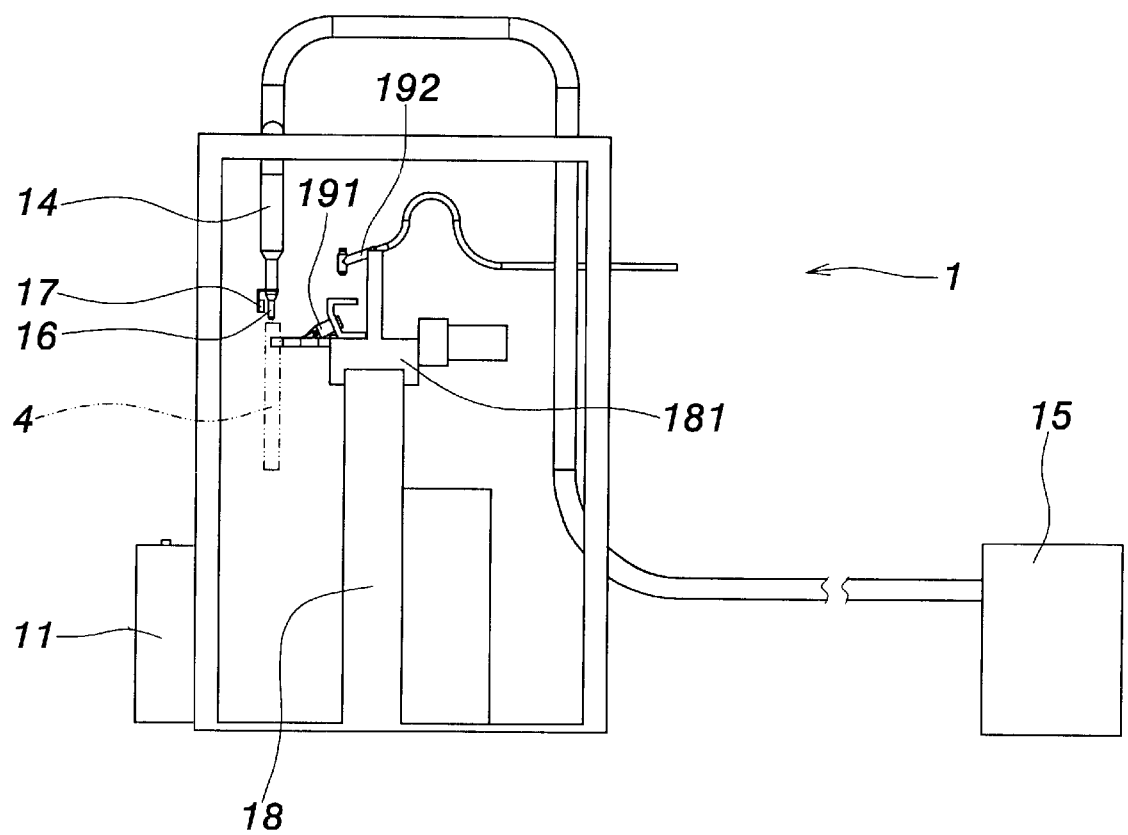
FIG. 2 is a lateral view of the prior art design.
Figure 3:
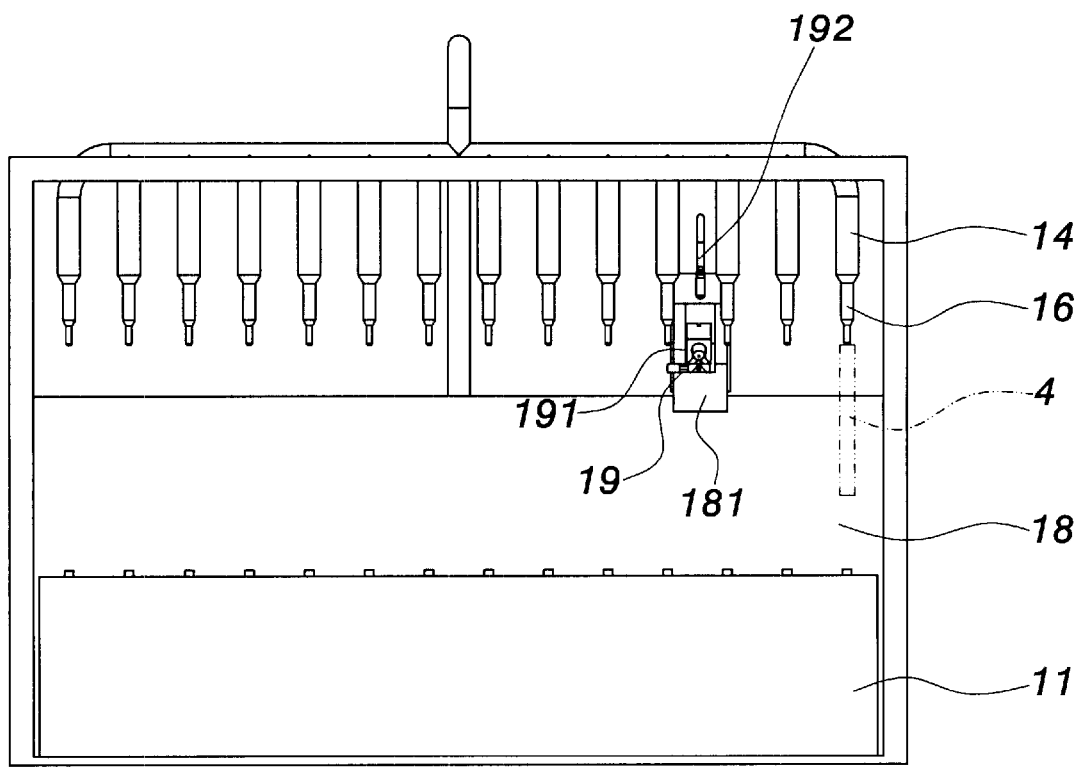
FIG. 3 is a front view of the prior art design.
Figure 4:
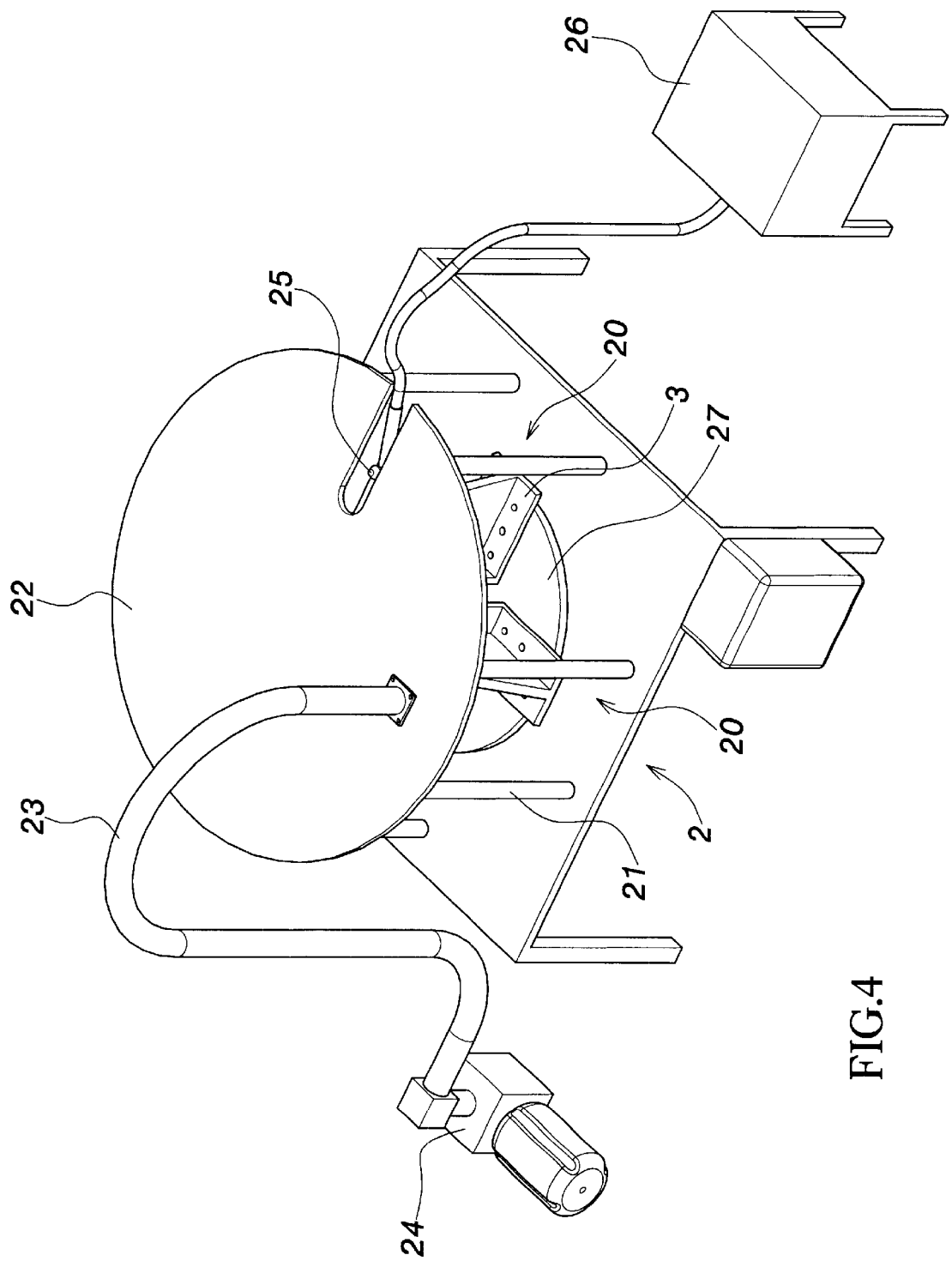
FIG. 4 is a perspective view of the present invention.
Figure 5:
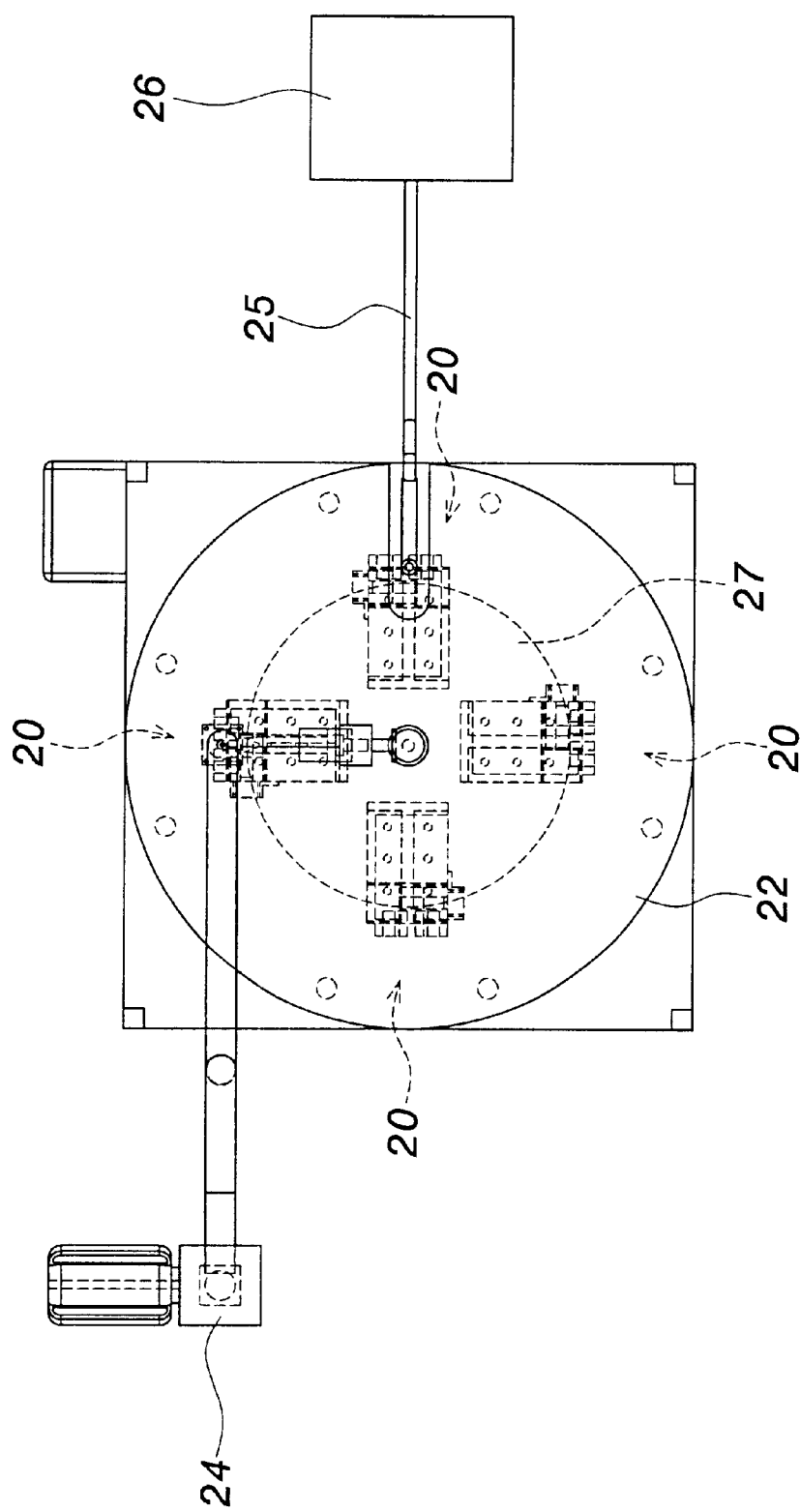
FIG. 5 is an upper view of the present invention.
Figure 6:
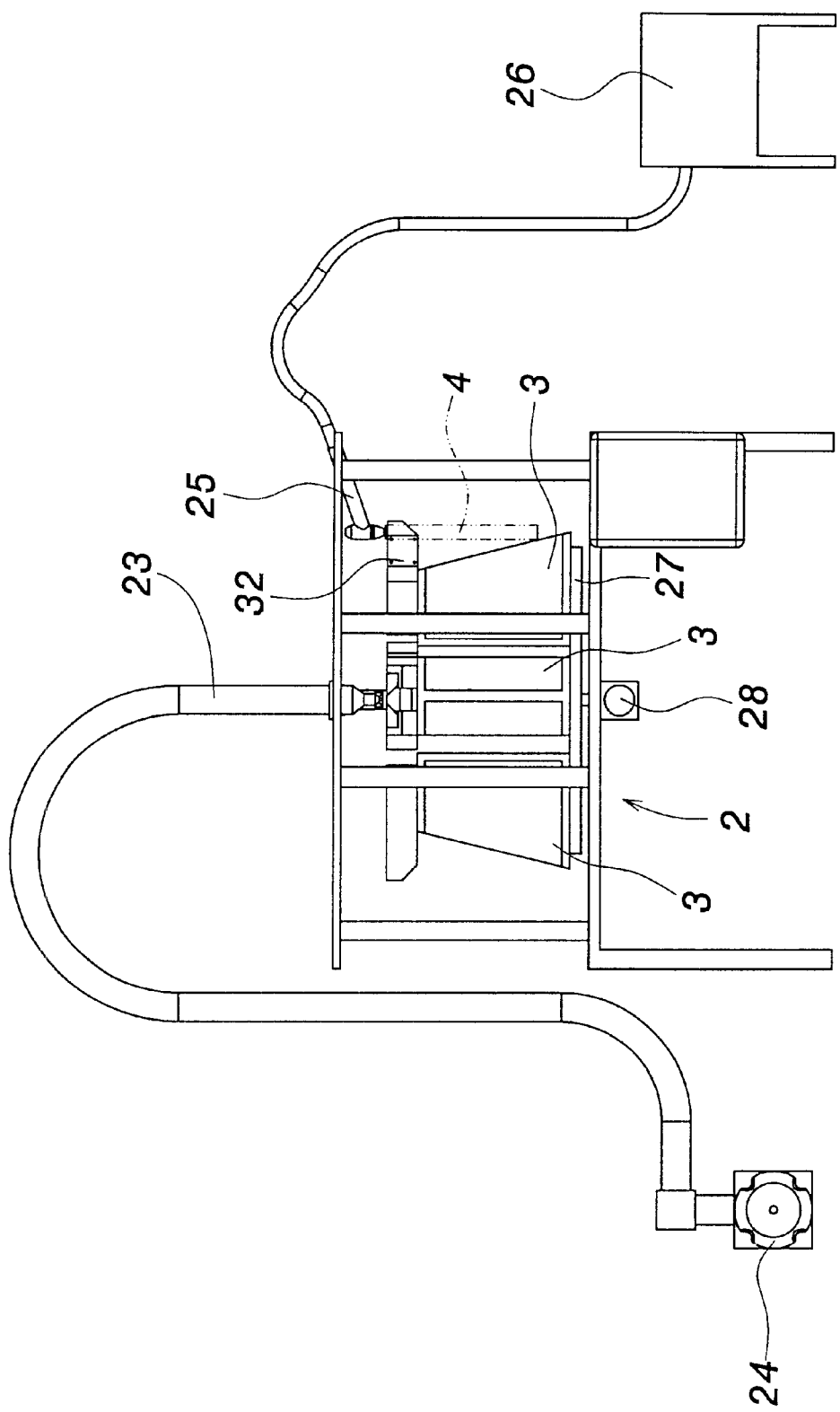
FIG. 6 is front view of the present invention.
Figure 7:
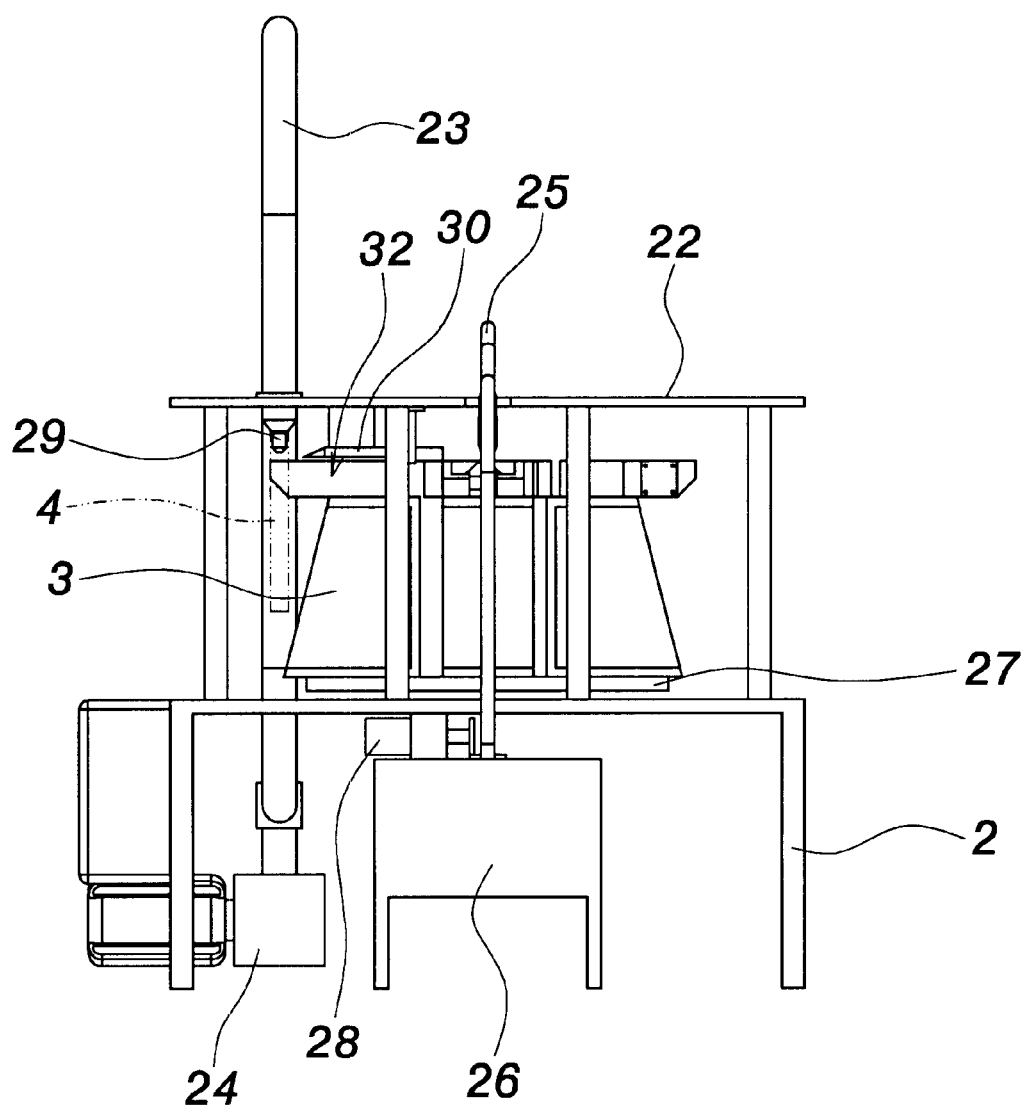
FIG. 7 is a right side view of the present invention.

With reference to FIGS. 4 to 9, the heat pipe shaping device of the present invention is illustrated. A square table 2 is illustrated in FIGS. 4 to 7, and each of the four sides of the table 2 is installed with a work station 20. The top periphery of the table 2 is elevated a top plate 22 by a plurality of supporting rods 21. The top plate 22 is connected to a vacuum manifold 23 so that the vacuum manifold 23 is connected to a vacuum pump 24. The top plate 22 is also connected to a welding gun 25. The welding gun 25 is connected with the welding machine 26. Each work station 20 is connected to a rotary disk 27 at the top of the table 2. The rotary disk 27 is driven by the motor 28 in the table 2. The motor 28 may drive the rotary disk 27 reciprocally or rotationally.

Figure 9:
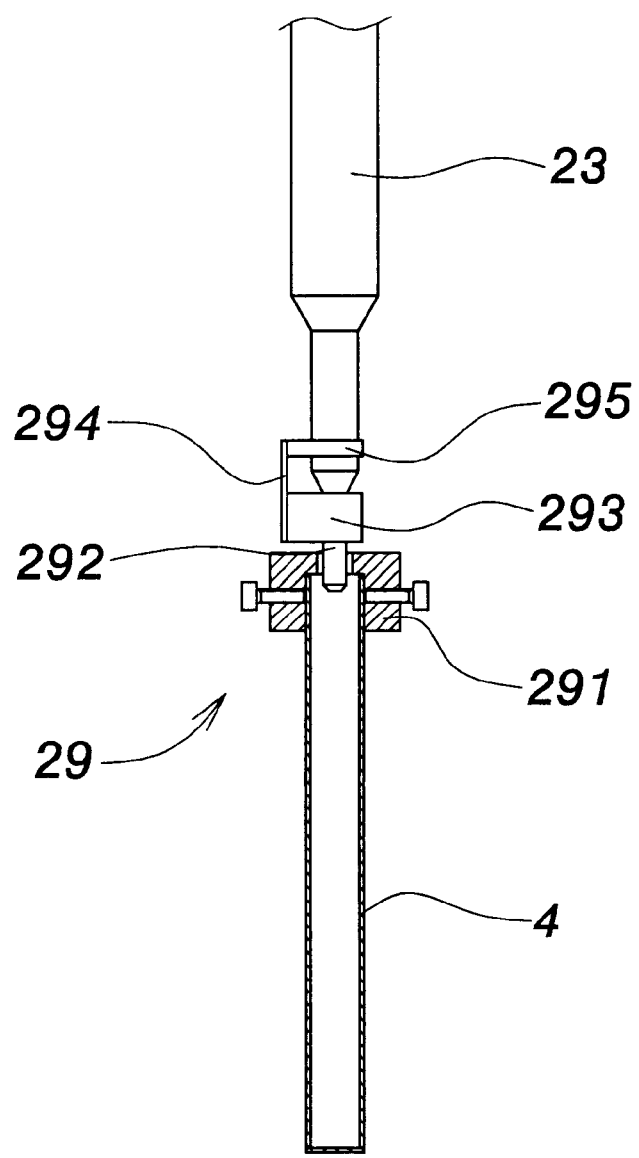
FIG. 9 is a front view of the holding unit according to the present invention.

Each work station 20 on the rotary disk 27 has a supporter 3. The top piece 31 of the supporter 3 is installed with a press and cutting unit 32. One end of the vacuum manifold 23 is installed with a holding unit 29. The holding unit 29 holds the heat pipe for vacuuming, as illustrated in FIG. 9. The holding unit 29 has a combining mask 291. The combining mask 291 serves to hold or lock an upper end of the heat pipe. The combining mask 291 is connected to the vacuum manifold 23 through a solenoid valve 293 by a pipe 292. The solenoid valve 293 is fixed at the lower end of the vacuum manifold 23. The vacuum manifold 23 is fixed to the top plate 22 and a top plate 22 protrudes downwards.

Figure 8:
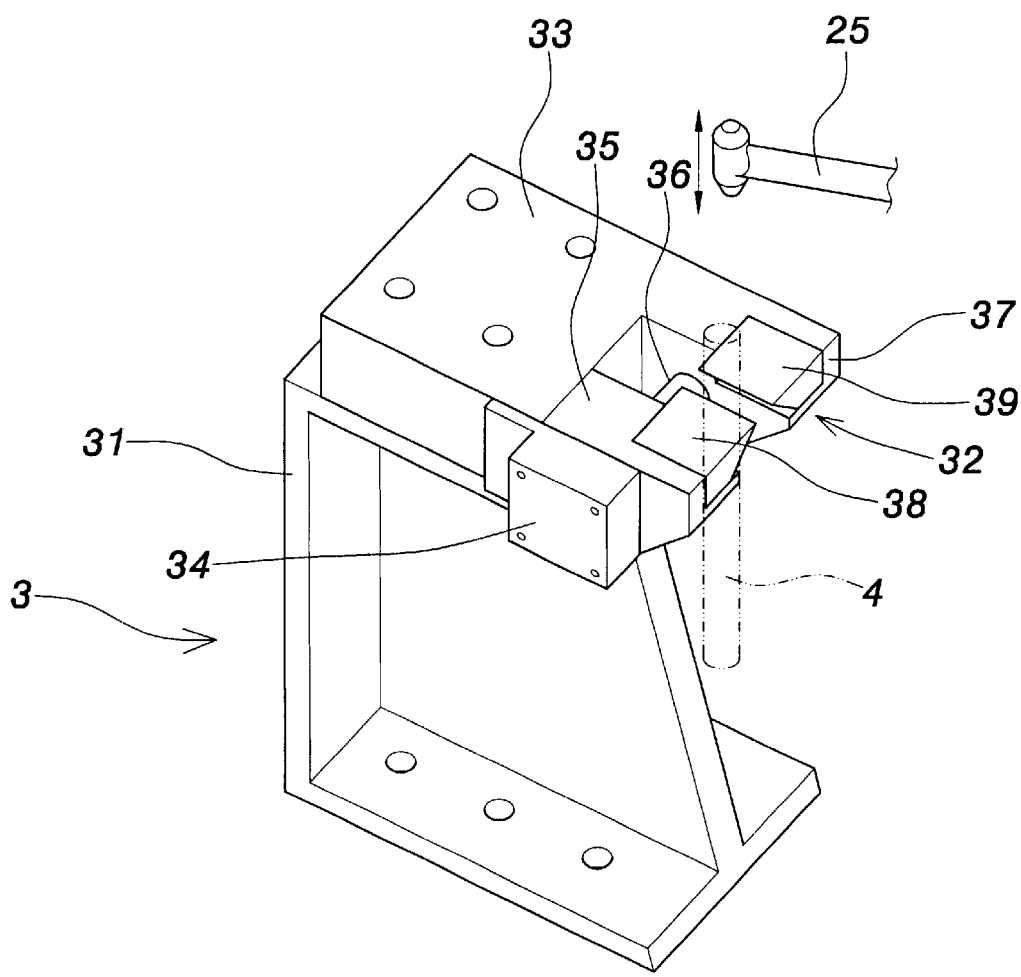
FIG. 8 is a partial perspective view of the present invention.

The press and cutting unit 32 is connected to the seat 33 at the top piece 31. The front end of the seat 33 extends out of the top piece 31. A side of the outer end of the seat 33 is installed with an oil pressure thin block 34. The oil pressure thin block 34 passes through a guide 36. The guide 36 is installed with a moving block 35. The moving block 35 extends with a fixing block 37. The fixing mold 39 extends from the fixing block 37. The moving block 35 is connected to a moving mold 38. When the moving block 35 is driven by the oil pressure thin block 34 to move toward the fixing block 37. At first, the moving mold 38 and the fixing mold 39 are press a heat pipe. If they move further, the molds 38, 39 clamp a pneumatic cutter 30 at the upper side thereof. As shown in FIG. 8, if the press and cutting unit 32 has a welding gun 25 thereon. Then the welding gun 25 move downwards to spot-weld the heat pipe. The supporter 3 has C shape, and a rib formed at a middle portion. The area of the top piece 31 at the top thereof is smaller than the lower end.

The vacuum manifold 23 and welding gun 25 are installed above the work stations 20 above or through the top plate 22 for clamping the heat pipe so that the machining of pressing, cutting, spot-welding, and clamping and releasing heat pipe can be performed. Referring to FIGS. 4 to 7, a reciprocally swinging structure by the table 2 is illustrated. A work station 20 at one sides serves to detach the heat pipe, and seal and spot-welding the opening of the heat pipe, while a work station 20 at another side serves to install and fix a semi-product of the heat pipe, pumping the heat pipe to a vacuum, pressing the heat pipe, and cutting the unnecessary section of the heat pipe. In the figure, two work stations 20 are installed at the orthogonal sides of the table. The rotary disk 27 is rotatable. Namely, it can continuous rotate to each station, or rotate to one station and then return to the original station so as to be formed as a reciprocal swinging. Therefore, the machining at two ends of a side is performed. Furthermore, a machining of multiple stages can be performed.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A heat pipe shaping device comprising:

a table, each lateral surface of the table having a work station;

top plate being elevated by a plurality of supporting rods at a periphery of the table;

a vacuum manifold being connected to the top plate; thereby, the vacuum manifold being connected to an vacuum pump; one end of the vacuum manifold being installed with a holding unit for clamping one end of the heat pipe for pumping to a vacuum;

a welding gun positioned at the top plate so that the welding gun is connected to a welding machine; and a rotary disk; each work station being connected to a surface of the rotary disk on the table; the rotary disk being driven by a motor in the table; each work station on the rotary disk having an supporter; a top of each supporter being installed with a pressing unit and a cutting unit; the pressing unit pressing an upper end of the heat pipe so that the end is compressed and sealed, and then the cutting unit cutting a distal end of the heat pipe;

when the rotary disk pumps the heat pipe to a vacuum at a work station, the work station presses and cuts the heat pipe; then the rotary disk rotates to a next work station for spot-welding; in that work station, the vacuum manifold and the welding gun are spaced on a top plate; and the operations of clamping a heat pipe, pumping to a vacuum, pressing and cutting, spot-welding, releasing the holding unit are performed.

2. The heat pipe shaping device as claimed in claim 1, wherein the motor drive the rotary disk to move reciprocally.

3. The heat pipe shaping device as claimed in claim 1, wherein the motor drive the rotary disk to rotate.

4. The heat pipe shaping device as claimed in claim 1, wherein the pressing unit and cutting unit are integrated, a seat is connected to a supporter of the work station; a front end of the seat protrudes out, and one side at an outer end of the seat is installed with an oil pressure thin block; the oil pressure thin block is installed with a moving block through a guide rod; a fixing block is extended from the seat at a position with respect to the moving block; the fixing block is connected to a fixing mold; the moving block has a moving mold; when the moving block is driven by the oil pressure thin block to move along the guide rod to the fixing block; so that a compressing operation is generated by the contact between the moving mold and the fixing mold; then the moving block moves, then the pneumatic cutter serves to cut a distal end of the heat pipe.

\* \* \* \* \*